(12) United States Patent
Shirasaki et al.

(10) Patent No.: US 8,227,520 B2
(45) Date of Patent: *Jul. 24, 2012

(54) EMULSION COMPOSITION FOR SILICONE RUBBER SPONGE, PROCESS FOR PRODUCING THE SAME, AND PROCESS FOR PRODUCING SILICONE RUBBER SPONGE

(75) Inventors: Shinya Shirasaki, Fukui (JP); Tadanori Fukamachi, Awara (JP); Mitsuo Hamada, Kisarazu (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 1376 days.

This patent is subject to a terminal disclaimer.

(21) Appl. No.: 10/598,523

(22) PCT Filed: Mar. 5, 2004

(86) PCT No.: PCT/JP2004/002883
§ 371 (c)(1),
(2), (4) Date: Jun. 19, 2007

(87) PCT Pub. No.: WO2005/085357
PCT Pub. Date: Sep. 15, 2005

(65) Prior Publication Data
US 2008/0021125 A1 Jan. 24, 2008

(51) Int. Cl.
*C08J 9/00* (2006.01)
(52) U.S. Cl. .............. 521/65; 524/70; 524/91; 524/154; 524/588; 525/100; 528/15; 528/31; 528/32
(58) Field of Classification Search ...... 528/10
See application file for complete search history.

(56) References Cited

U.S. PATENT DOCUMENTS

| | | | |
|---|---|---|---|
| 3,294,725 A * | 12/1966 | Findlay et al. | 524/745 |
| 4,189,545 A | 2/1980 | Modic | |
| 4,221,688 A * | 9/1980 | Johnson et al. | 524/251 |
| 4,248,751 A * | 2/1981 | Willing | 524/588 |
| 4,391,921 A | 7/1983 | Johnson | |
| 4,427,811 A * | 1/1984 | Elias et al. | 524/96 |
| 4,473,667 A | 9/1984 | Sands | |
| 4,559,369 A | 12/1985 | Bauman et al. | |
| 4,572,917 A | 2/1986 | Graiver et al. | |
| 4,624,900 A * | 11/1986 | Fau | 428/447 |
| 4,741,861 A * | 5/1988 | Okada et al. | 516/120 |
| 4,876,805 A * | 10/1989 | Peoples | 36/43 |
| 5,135,960 A | 8/1992 | Higuchi et al. | |
| 5,153,231 A | 10/1992 | Bouquet et al. | |
| 5,246,973 A | 9/1993 | Nakamura et al. | |
| 5,332,762 A * | 7/1994 | Maschberger et al. | 521/91 |
| 5,399,402 A * | 3/1995 | Inoue et al. | 428/35.7 |
| 5,827,921 A * | 10/1998 | Osawa et al. | 524/837 |
| 7,459,213 B2 * | 12/2008 | Yamamoto et al. | 428/447 |
| 7,683,125 B2 | 3/2010 | Shirasaki et al. | |
| 2004/0152825 A1* | 8/2004 | Yamamoto et al. | 524/503 |
| 2007/0015868 A1* | 1/2007 | Shirasaki et al. | 524/861 |
| 2007/0099007 A1* | 5/2007 | Benayoun et al. | 428/447 |
| 2011/0021649 A1 | 1/2011 | Sakuma et al. | |
| 2011/0190410 A1 | 8/2011 | Nozoe et al. | |

FOREIGN PATENT DOCUMENTS

| | | |
|---|---|---|
| EP | 0522585 A1 | 1/1993 |
| EP | 1627900 A1 | 2/2006 |
| EP | 1724308 A1 | 11/2006 |
| JP | 54135865 | 10/1979 |
| JP | 59012830 | 1/1984 |
| JP | 59012832 | 1/1984 |
| JP | 61103945 | 5/1986 |
| JP | 61108640 | 5/1986 |
| JP | 5070692 | 3/1993 |
| JP | 5209080 | 8/1993 |
| JP | 6207038 | 7/1994 |
| JP | 6287348 | 10/1994 |
| JP | 7247436 | 9/1995 |
| JP | 7122000 B | 12/1995 |
| JP | 11130963 | 5/1999 |
| JP | 11236508 | 8/1999 |
| JP | 2002114860 | 4/2002 |
| JP | 2003096223 | 4/2003 |
| JP | 2004091569 | 3/2004 |
| JP | 2004-143332 | 5/2004 |
| JP | 2004143332 | 5/2004 |
| JP | 2004346248 | 12/2004 |
| JP | 2005062534 | 3/2005 |
| JP | 2005255968 | 9/2005 |
| JP | 2008163060 | 7/2008 |

(Continued)

OTHER PUBLICATIONS

English language abstract and translation of JP 2004-143332 extracted from Searching PAJ, Apr. 29, 2008, 27 pages.
English language abstract for JP5070692 extracted from espacenet.com database Jan. 5, 2007.
English language abstract for JP5209080 extracted from espacenet.com database Jan. 5, 2007.
English language abstract for JP7247436 extracted from espacenet.com database Jan. 5, 2007.
English language abstract for JP11130963 extracted from espacenet.com database Jan. 5, 2007.
English language abstract for JP59012832 extracted from espacenet.com database Jan. 5, 2007.
English language abstract for JP61103945 extracted from espacenet.com database Jan. 5, 2007.
English language abstract for JP61108640 extracted from espacenet.com database Jan. 5, 2007.
English language abstract for JP6207038 extracted from espacenet.com database Jan. 5, 2007.

(Continued)

*Primary Examiner* — Marc Zimmer
(74) *Attorney, Agent, or Firm* — Howard & Howard Attorneys PLLC

(57) ABSTRACT

A silicone rubber sponge emulsion composition comprising (A) (a) a liquid diorganopolysiloxane having at least two alkenyl groups per molecule, or a paste-like mixture of (a) a liquid diorganopolysiloxane having at least two alkenyl groups per molecule and (d) a reinforcing filler, (b) an organopolysiloxane having at least two silicon-bonded hydrogen atoms per molecule, and (c) a platinum catalyst, (B) an aqueous solution of a water-soluble polymer, and (C) an emulsifying agent; its production; and production of silicone rubber sponge, wherein silicone rubber sponge is obtained by curing the composition into a molding and heating the molding.

23 Claims, No Drawings

FOREIGN PATENT DOCUMENTS

| | | |
|---|---|---|
| JP | 2008214625 A | 9/2008 |
| WO | WO 2004074378 A1 | 9/2004 |
| WO | WO 2008096882 A1 | 8/2008 |
| WO | WO 2010013847 A1 | 2/2010 |

OTHER PUBLICATIONS

English language abstract for JP6287348 extracted from espacenet.com database Jan. 5, 2007.

English language abstract for JP2002114860 extracted from espacenet.com database Jan. 5, 2007.

English language abstract for JP2004091569 extracted from espacenet.com database Jan. 5, 2007.

English language translation for JP2004-143332, 16 pages.

English language abstract and translation for JP 11236508 extracted from the PAJ database on Aug. 2, 2011, 37 pages.

English language abstract and translation for JP 2003096223 extracted from the PAJ database on Aug. 2, 2011, 45 pages.

English language abstract and translation for JP 2004346248 extracted from the PAJ database on Aug. 2, 2011, 35 pages.

English language abstract and translation for JP 2005062534 extracted from the PAJ database on Aug. 2, 2011, 40 pages.

English language abstract and translation for JP 2005255968 extracted from the PAJ database on Aug. 2, 2011, 44 pages.

English language abstract and translation for JP 2008163060 extracted from the PAJ database on Aug. 2, 2011, 52 pages.

English language abstract for JP 2008214625 extracted from the espacenet.com database on Aug. 2, 2011, 16 pages.

English language abstract for WO 2004074378 extracted from the espacenet.com database on Sep. 16, 2011, 32 pages.

English language abstract for WO 2010013847 extracted from the espacenet.com database on Sep. 16, 2011, 42 pages.

International Search Report for Application No. PCT/JP2009/063910 dated Dec. 15, 2009, 5 pages.

International Search Report for Application No. PCT/JP2008/052203 dated May 16, 2008, 2 pages.

* cited by examiner

EMULSION COMPOSITION FOR SILICONE RUBBER SPONGE, PROCESS FOR PRODUCING THE SAME, AND PROCESS FOR PRODUCING SILICONE RUBBER SPONGE

RELATED APPLICATIONS

This application claims priority to and all the advantages of International Patent Application No. PCT/JP2004/002883, filed on Mar. 5, 2004.

TECHNICAL FIELD

The present invention relates to a silicone rubber sponge emulsion composition, its production, as well as to production of silicone rubber sponge from the emulsion composition.

TECHNICAL BACKGROUND

Owing to its heat resistance, light weight, and superior weatherability, silicone rubber sponge is used for packing, gaskets, O-rings and other automotive components; for copier roll surface-covering materials; and for various sealing materials, etc. As described below, in the past, numerous compositions have been suggested for use in the forming of such silicone rubber sponge.

For example, silicone rubber sponge-forming compositions obtained by adding thermally decomposable organic foaming agents represented by azobisisobutyronitrile are taught in Japanese Examined Patent Application Publication No. (hereafter referred to JP Kokoku) Sho 44-461 and Japanese Unexamined Patent Application Publication No. (hereafter referred to JP Kokai) Hei 7-247436 and a silicone rubber sponge-forming composition obtained by adding balloons having an outer shell of thermoplastic plastic containing butane, isopropane, or other volatile hydrocarbons inside is proposed in JP Kokai No. Hei 5-209080. However, thermally decomposable organic foaming agents and their thermal decomposition products are not good for health. In addition, since the compositions make use of gases generated by the decomposition of thermally decomposable foaming agents on heating as foaming agents or utilize thermoexpandable balloons as foaming agents, they are not easily amenable to compression molding and molding under hermetically sealed conditions, and although they are suitable for making moldings of simple shapes, they are not suitable for applications involving moldings of complex shapes and their applications are limited.

A silicone rubber sponge-forming composition, which comprises an alkenyl-containing diorganopolysiloxane, an organohydrogenpolysiloxane, a small amount of water, and a platinum catalyst and is foamed by hydrogen gas generated by a reaction between the organohydrogenpolysiloxane and water during crosslinking via hydrosilation, is taught in JP Kokai Sho 54-135865, a silicone rubber sponge-forming composition, in which liquid alcohol is used instead of water, is taught in JP Kokai Hei 5-70692, and a silicone rubber sponge-forming composition, which is a hydrosilation reaction-crosslinkable composition comprising an alkenyl-containing diorganopolysiloxane, an organohydrogenpolysiloxane, and a platinum catalyst and is foamed by excess organohydrogenpolysiloxane, water, and monohydric or polyhydric alcohol, is taught in JP Kokai Hei 11-130963. Such hydrosilation-crosslinkable, i.e. addition-curable type silicone rubber sponge-forming compositions pose safety problems because they all utilize hydrogen gas generated during curing as a foaming agent. Moreover, depending on the amount of material injected into the cavity during compression molding and injection molding, cell structure may become uneven, part dimensions in the mold and as-molded part dimensions may end up different, resulting in poor dimensional accuracy. A silicone rubber sponge-forming composition, which comprises an organopolysiloxane, an emulsifying agent, water, and a thickening agent and is foamed by means of evaporation and expansion of water, is taught in JP Kokai Hei 7-122000 and a silicone rubber sponge-forming composition, which is a hydrosilation-crosslinkable, i.e. addition-curable type composition comprising an alkenyl-containing diorganopolysiloxane, an organohydrogenpolysiloxane, and a platinum catalyst and which contains water absorbent polymer particles, is taught in JP Kokoku 2002-114860. However, despite being suitable for compression molding applications and for imparting superior dimensional accuracy to molded articles, i.e. sponge moldings, these compositions lack sufficient cell fineness and cell uniformity.

Additionally, a method for fabricating silicone rubber sponge by curing a condensation-curable type silicone emulsion comprising a diorganopolysiloxane having both ends blocked by hydroxyl groups and an organotin catalyst by freezing and, after thawing, removing water therefrom, is taught in JP Kokai Sho 59-12832. This method, however, leads to poor productivity due to the energy and time requirements imposed by freezing and thawing, as well as to the poor heat resistance resulting from the use of the organotin catalyst. On the other hand, despite the existence of well-known hydrosilation-crosslinkable, i.e. addition-curable type silicone rubber emulsion compositions and methods for producing silicone rubber and coating films from such compositions, there are no known addition-curable type silicone rubber sponge emulsion compositions or methods for producing silicone rubber sponge from such emulsion compositions.

DISCLOSURE OF THE INVENTION

It is an object of the present invention to provide an emulsion composition used for obtaining silicone rubber sponge with cells of small diameters and excellent uniformity without using organic foaming agents, hydrogen gas and volatile hydrocarbon gases as foaming agents, a method for producing said silicone rubber sponge emulsion composition, and a method for efficiently producing silicone rubber sponge having superior dimensional accuracy and cells of small diameters and excellent uniformity from said emulsion composition.

The present invention relates to:
1. A silicone rubber sponge emulsion composition, which comprises (A) a liquid silicone rubber base comprising (a-1) a liquid diorganopolysiloxane having at least two alkenyl groups per molecule or (a-1) a liquid diorganopolysiloxane having at least two alkenyl groups per molecule and (a-4) a reinforcing filler, (a-2) an organopolysiloxane having at least two silicon-bonded hydrogen atoms per molecule, and (a-3) a platinum catalyst, (B$^1$) an aqueous solution of (b-1) a water-soluble polymer, and (C) an emulsifying agent, and in which (a-1) to (a3) or (a-1) to (a-4) in component (A) form an addition-curable type liquid silicone rubber composition, component (B) is contained in a proportion ranging from 50 to 250 parts by weight and component (C) is contained in a proportion ranging from 0.1 to 10 parts by weight per 100 parts by weight of the total of (a-1) to (a-3) or the total of (a-1) to (a-4) in component (A).

2. A method for producing the silicone rubber sponge emulsion composition according to 1, wherein an addition-curable type liquid silicone rubber composition is prepared by mixing (A) a liquid silicone rubber base comprising (a-1) a liquid diorganopolysiloxane having at least two alkenyl groups per molecule, or (a-1) a liquid diorganopolysiloxane having at least two alkenyl groups per molecule and (a-4) a reinforcing filler, (a-2) an organopolysiloxane having at least two silicon-bonded hydrogen atoms per molecule, and (a-3) a platinum catalyst and an emulsion is produced by mixing the addition-curable type liquid silicone rubber composition with ($B^1$) an aqueous solution of (b-1) a water-soluble polymer, and (C) an emulsifying agent.

3. A method for producing the silicone rubber sponge emulsion composition according to 1, wherein an emulsion is produced by mixing (A) a liquid silicone rubber base comprising (a-1) a liquid diorganopolysiloxane having at least two alkenyl groups per molecule or (a-1) a liquid diorganopolysiloxane having at least two alkenyl groups per molecule and (a-4) a reinforcing filler, ($B^1$) an aqueous solution of (b-1) a water-soluble polymer, and (C) an emulsifying agent, and the emulsion is mixed with (a-2) an organopolysiloxane having at least two silicon-bonded hydrogen atoms per molecule and (a-3) a platinum catalyst.

4. A silicone rubber sponge emulsion composition, which comprises (A) a liquid silicone rubber base comprising (a-1) a liquid diorganopolysiloxane having at least two alkenyl groups per molecule or (a-1) a liquid diorganopolysiloxane having at least two alkenyl groups per molecule and (a-4) a reinforcing filler, (a-2) an organopolysiloxane having at least two silicon-bonded hydrogen atoms per molecule, (a-3) a platinum catalyst, ($B^2$) an aqueous solution of (b-1) a water-soluble polymer and (C) an emulsifying agent, and in which (a-1) to (a3) or (a-1) to (a-4) in component (A) form an addition-curable type liquid silicone rubber composition, component (b-1) and water are contained in a proportion ranging from 10 to 250 parts by weight and component (C) is contained in a proportion ranging from 0.1 to 10 parts by weight per 100 parts by weight of the total of (a-1) to (a-3) or the total of (a-1) to (a-4) in component (A).

5. The silicone rubber sponge emulsion composition according to 1 or 4, wherein component (b-1) is sodium salt of an acrylic acid polymer and component (C) is a nonionic surfactant.

6. The silicone rubber sponge emulsion composition according to 5, wherein the sodium salt of an acrylic acid polymer is sodium salt of polyacrylic acid.

7. The silicone rubber sponge emulsion composition according to 1 or 4, wherein component (b-1) is contained in component ($B^1$) or component ($B^2$) in an amount of 0.1 to 5% by weight.

8. The method for producing a silicone rubber sponge emulsion composition according to 2 or 3, wherein component (b-1) is sodium salt of an acrylic acid polymer and component (C) is a nonionic surfactant.

9. The method for producing a silicone rubber sponge emulsion composition according to 8, wherein the sodium salt of an acrylic acid polymer is the sodium salt of polyacrylic acid.

10. The method for producing a silicone rubber sponge emulsion composition according to 2 or 3, wherein component (b-1) is contained in component ($B^1$) or component ($B^2$) in an amount of 0.1 to 5% by weight.

11. A method for producing silicone rubber sponge, wherein silicone rubber sponge is obtained by forming a moist silicone rubber-like molding by curing the silicone rubber sponge emulsion composition according to 1 or 4 and then evaporating water from the molding by heating.

12. The method for producing a silicone rubber sponge according to 11, wherein the silicone rubber sponge emulsion composition is cured at a temperature between room temperature and less than 120° C. and the cured product is heated at 120° C. to 250° C.

13. The method for producing a silicone rubber sponge according to 11 or 12, wherein the silicone rubber sponge emulsion composition does not contain air bubbles.

BEST MODE FOR CARRYING OUT THE INVENTION

The addition-curable type liquid silicone rubber composition comprising (A) (a-1) a liquid diorganopolysiloxane having at least two alkenyl groups per molecule, (a-2) an organopolysiloxane having at least two silicon bonded hydrogen atoms per molecule, and (a-3) a platinum catalyst, which is used as a silicone rubber sponge emulsion composition, is liquid at normal temperatures and is converted to a rubbery state through the crosslinking and curing of component (a-1) and component (a-2) by the addition of the silicon-bonded hydrogen atoms of component (a-2) to the silicon-bonded alkenyl groups of component (a-1) under the catalytic action of component (a-3).

The alkenyl groups in the liquid diorganopolysiloxane having at least two alkenyl groups per molecule (a-1) are exemplified by vinyl, allyl, propenyl, and hexyl groups, with vinyl groups being preferable from the standpoint of manufacturing simplicity. Organic groups other than alkenyl are exemplified by methyl; ethyl, propyl, hexyl, and other alkyl groups; phenyl, tolyl, and other aryl groups; 3,3,3-trifluoropropyl, 3-chloropropyl, and other halogenated alkyl groups, with methyl being preferable from the standpoint of manufacturing simplicity. The molecular structure of this component may be either a linear structure or a linear structure containing branches. There are no particular limitations concerning the molecular weight of this component as long as the component is liquid at normal temperatures, and its viscosity at 25° C. is preferably not less than 100 mPas and not more than 100,000 mPas.

This component is exemplified by dimethylpolysiloxane, methylalkylpolysiloxane, methylvinylpolysiloxane, dimethylsiloxane-methylvinylsiloxane copolymer, methylphenylpolysiloxane, and methyl(3,3,3-trifluoropropyl)polysiloxane having both ends blocked by dimethylvinylsiloxy groups; methylvinylpolysiloxane and dimethylsiloxane-methylvinylsiloxane copolymer having both ends blocked by trimethylsiloxy groups; methylvinylpolysiloxane and dimethylsiloxane-methylvinylsiloxane copolymer having both ends blocked by dimethylhydroxylsiloxy groups; and dimethylpolysiloxane having both ends blocked by methyldivinylsiloxy or trivinylsiloxy groups. Two or more types of the above-mentioned diorganopolysiloxanes may be combined.

Furthermore, the organopolysiloxane having at least two silicon-bonded hydrogen atoms per molecule (a-2) is a cross-linking agent for component (a-1). Under the catalytic action of component (a-3), the silicon-bonded hydrogen atoms of this component are added to the silicon-bonded alkenyl groups in component (a-1), thereby cross-linking and curing component (a-1). Although this component has at least two silicon-bonded hydrogen atoms, when there are two silicon-bonded alkenyl groups in component (a-1), it needs to have not less than three silicon-bonded hydrogen atoms. The silicon-bonded organic groups of component (a-2) are exemplified by methyl; ethyl, propyl, hexyl, and other alkyl groups; phenyl, tolyl, and other aryl groups; and by 3,3,3-trifluoropropyl, 3-chloropropyl, and other halogenated alkyl groups.

The molecular structure of this component may be linear, branched, cyclic, or network-like. There are no particular limitations concerning the degree of polymerization of this component so long as it is not less than 2, and its viscosity at 25° C. is preferably between 3 and 10,000 mPas.

The compounding ratio of component (a-1) and component (a-2) is preferably such that the molar ratio of the silicon-bonded hydrogen atoms of component (a-2) and the silicon-bonded alkenyl groups of component (a-1) is preferably (0.5:1) to (20:1) and, even more preferably, (0.8:1) to (5:1). This is due to the fact that superior curability is difficult to obtain when the molar ratio is smaller than 0.5 and the hardness of the cured product becomes excessively high when it is greater than 20.

The platinum catalyst (a-3) is a catalyst used for the cross-linking and curing of component (a-1) through the addition of the silicon-bonded hydrogen atoms of component (a-2) to the silicon-bonded alkenyl groups of component (a-1). It is exemplified by platinum micropowder, platinum black, chloroplatinic acid, olefin complexes of chloroplatinic acid, chloroplatinic acid/divinyltetramethyldisiloxane complexes, platinum complexes of divinyltetramethyldisiloxane, chloroplatinic acid/.beta.-diketone complexes, platinum complexes of .beta.-diketone, rhodium compounds, and palladium compounds. Component (a-3) is used in so-called catalytic amounts, i.e. amounts sufficient for the cross-linking and curing of component (a-1) through the addition of the silicon-bonded hydrogen atoms of component (a-2) to the silicon-bonded alkenyl groups of component (a-1). Specifically, it should be used in an amount of 1 to 1000 ppm by weight, based on platinum metal, relative to component (A).

To adjust the flowability or improve the mechanical strength of the cured product, the liquid silicone rubber composition may be combined with various fillers. Such fillers are exemplified by fumed silica, precipitated silica, aerogels, and other reinforcing silica fillers; carbon black, colloidal calcium carbonate, fumed titanium dioxide, and other reinforcing fillers; quartz micropowder, diatomaceous earth, aluminosilicic acid powder, magnesium oxide powder, precipitated calcium carbonate, and other semi-reinforcing and non-reinforcing fillers; reinforcing silica fillers hydrophobicized with dimethyldichlorosilane, trimethylchlorosilane, hexamethyldisilazane, octamethylcyclotetrasiloxane, and other organosilicon compounds; and calcium carbonate powder treated with a resin acid or a higher fatty acid. It is especially preferable to pre-mix component (a-1) with a reinforcing filler (a-4), in particular, a reinforcing silica filler, in order to make a paste-like mixture and then combine the mixture with the rest of the components. Mixing under heating is preferable when preparing the paste-like mixture, and hydrophobing agents, such as hexamethyldisilazane or dimethylsiloxane blocked by silanol groups, can be added when the components are mixed. The reinforcing filler (a-4) may be added in an amount of 1 to 60 parts by weight, and, preferably, 5 to 40 parts by weight, per 100 parts by weight of component (a-1).

The mixture of component (a-1) to component (a-3) tends to undergo addition reactions even at normal temperatures and it is preferable to further combine it with an addition reaction inhibitor in order to prevent cross-linking reactions from taking place during emulsification or during storage of the emulsion. The addition reaction inhibitor is exemplified by acetylene alcohols, ene-yne compounds, benzotriazole, and tetramethyltetravinylcyclotetrasiloxane. The addition reaction inhibitor should be added to component (A) in an amount that suppresses addition reactions between component (a-1) and component (a-2) at normal temperatures and does not inhibit addition reactions under heating. It is usually preferable to add the addition reaction inhibitor in the amount of 0.01 to 5 parts by weight per 100 parts by weight of the total of component (a-1) to component (a-3). Alcohols, pigments, heat resistance agents, flame retarders, plasticizers, antibacterial agents, fungicides, tackifiers, etc. may be further combined with component (A) as needed. The aqueous solution of a water-soluble polymer (B) provides a solute necessary for emulsifying component (A).

As long as the water is pure, there are no limitations concerning the type of the water used in component (B), which is a solute necessary for the preparation of the silicone rubber sponge emulsion. It is exemplified by tap water, well water, ion exchange water, and distilled water. The amount of added component (B) is 50 to 250 parts by weight, and more preferably, 70 to 200 parts by weight, per 100 parts by weight of the total of (a-1), (a-2), and (a-3) in component (A). This is due to the fact that component (A) becomes difficult to be emulsified and the expansion ratio of the formed silicone rubber sponge becomes smaller when it is less than 50 parts by weight, and, on the other hand, the strength of the formed silicone rubber sponge is impaired when it exceeds 250 parts by weight. The water-soluble polymer contained in component (B), which may be a viscosity improver or thickening agent conventionally used for emulsions, is added in order to raise the viscosity of component (B) and prepare a stable emulsion using a small amount of emulsifying agent. The content of the water-soluble polymer in component (B) is 0.1 to 5% by weight, and, more preferably, 0.5 to 3% by weight. When its content is lower than 0.1% by weight, the viscosity of the aqueous solution of a water-soluble polymer decreases and it becomes difficult to obtain a stable emulsion, and, on the other hand, when it exceeds 5% by weight, the viscosity is too high and it becomes difficult to degas the emulsion, neither of which is desirable.

Among such water-soluble polymers, polymers with high viscosity in aqueous solutions are preferable and polymers whose molecules do not have functional groups and atoms (nitrogen, iodine, phosphorus, arsenic, etc.) inhibiting addition reactions are preferable as well. Naturally occurring polymers, modified naturally occurring polymers, and synthetic polymers may all be used. Specifically, they are exemplified by alginic acid, sodium salt of alginic acid, carrageenan, and other naturally occurring water-soluble polymers; sodium salt of carboxymethyl cellulose, sodium salt of carboxyethyl cellulose, methyl cellulose, ethyl cellulose, hydroxyethyl cellulose and other cellulose derivatives; modified starches, dextrin, dextran, and other starch derivatives; polyvinyl alcohols; sodium salt of polyacrylic acid, sodium salt of polymethacrylic acid, sodium salts of polyacrylic acid/methacrylic acid, and sodium salts of other acrylic acid polymers. From the standpoint of emulsion stability, however, sodium salts of acrylic acid polymers, and especially the sodium salt of polyacrylic acid, are particularly preferable. Two or more types of such water-soluble polymers may be used together.

The emulsifying agent (C) is added in order to form a stable emulsion by emulsifying component (A) in component (B). Although there are no particular limitations concerning the type of the emulsifying agents as long as they possess emulsifying power, nonionic emulsifying agents whose molecules do not have functional groups and atoms (nitrogen, iodine, phosphorus, arsenic, etc.) inhibiting addition reactions are preferred. Nonionic surfactants used as nonionic emulsifying agents are exemplified by polyoxyethylene alkyl ethers, polyoxyethylene alkyl phenyl ethers, ethyleneglycol monofatty acid esters, propyleneglycol monofatty acid esters, sorbitan monofatty acid esters, sorbitan trifatty acid esters, polyoxyethylene sorbitan trifatty acid esters, polyoxyethylene monofatty acid esters, polyoxyethylene difatty acid esters, polyoxyethylene propyleneglycol fatty acid esters, or POE polyhydric alcohols. The HLB values of the emulsifying agents are preferably between 6 and 14. Two or more types of these emulsifying agents may be used together.

Because component (A) is emulsified in component (B), which contains a water-soluble polymer and has a high viscosity, the amount of added component (C) can be greatly reduced in comparison with emulsification in water. The amount of added component (C) is 0.1 to 10 parts by weight, and more preferably, 0.5 to 7 parts by weight per 100 parts by weight of component (A). This is due to the fact that it becomes difficult to obtain a stable silicone rubber sponge emulsion composition if it is less than 0.1 parts by weight and the heat resistance of the silicone rubber sponge tends to decrease if it exceeds 10 parts by weight.

An aqueous solution of an emulsifying agent and a water-soluble polymer may be used for emulsifying component (A).

A silicone rubber sponge emulsion composition containing such component (A), component (B), and component (C) can be prepared, for instance, in accordance with the following methods.

(1) A predetermined amount of (A) a liquid silicone rubber composition, a predetermined amount of (B) an aqueous solution of a water-soluble polymer, and a predetermined amount of (C) an emulsifying agent are placed in a high-speed stirring mixer and mixed by stirring for a predetermined time.

(2) Predetermined amounts of component (a-1) from component (A), (B) an aqueous solution of a water soluble polymer, and (C) an emulsifying agent are placed in a high-speed stirring mixer and mixed together by stirring for a predetermined time, whereupon predetermined amounts of component (a-2) and component (a-3) are added and mixed therewith by stirring.

(3) Predetermined amounts of component (a-1) from component (A), and an aqueous solution of a water soluble polymer and (C) an emulsifying agent are placed in a high-speed stirring mixer and mixed together by stirring for a predetermined time, after which predetermined amounts of component (a-2) and component (a-3) are added and mixed therewith by stirring.

The high-speed stirring mixer used here is exemplified by Homomixers, paddle mixers, Henschel mixers, Homodispersers, colloid mills, stirring mixers for vacuum mixing, twin screw extruders, etc. However, there are no particular limitations concerning the type of the mixer as long as it has superior emulsifying power and produces stable emulsions.

If air bubbles are entrained into such a silicone rubber sponge emulsion composition during its preparation, it is preferable to degas it prior to curing.

Silicone rubber sponge can be fabricated from such a silicone rubber sponge emulsion composition using various methods. For instance, silicone rubber sponge with uniform and fine cells can be obtained by injecting the silicone rubber sponge emulsion composition into a cavity of a sheet mold used for compression molding, forming a moist silicone rubber sponge-like molding by keeping it under pressure at a temperature between normal temperature and 120° C. or, more preferably, between 50 and 100° C., and then removing water from the moist silicone rubber sponge-like molding by taking it out of the mold and heating it at 120 to 250° C. In addition, string-like silicone rubber sponge can also be fabricated by extruding the silicone rubber sponge emulsion composition from a nozzle in a rod-like shape, curing it by introducing into hot water at e.g. 80 to 100° C., and then hot air drying the cured product. Otherwise, silicone rubber sponge film can be formed by coating a glass cloth or a synthetic fiber cloth with the silicone rubber sponge emulsion composition and e.g. either curing it by heating to 50 to 120° C. and then hot air drying, or curing it with simultaneous dehydration by heating.

WORKING EXAMPLES

Below, the present invention is explained in detail by referring to working examples and comparative examples. In the description below, the term "parts" means "parts by weight" and "%" means "% by weight", with viscosity indicated using values obtained at 25° C. The properties of the silicone rubber sponge emulsion compositions, as well as those of the silicone rubber sponge, were determined under the following conditions.

Emulsification of silicone rubber sponge emulsion compositions: Evaluated by visually observing the external appearance of the silicone rubber sponge emulsion compositions immediately after preparation.

Silicone rubber sponge density: Sheets of silicone rubber sponge were punched using a puncher of a predetermined diameter, the weight and thickness of the punched-out pieces were measured, and their density was calculated as a ratio of weight/volume ($g/cm^3$).

Dimensional accuracy: A ratio, which was obtained by dividing of the thickness (mm) of a sheet of silicone rubber sponge after hot air drying by the thickness (mm) of a sheet of moist silicone rubber sponge prior to hot air drying, was calculated and used as a measure of dimensional accuracy.

Cell diameter: Obtained by observing a sheet of silicone rubber sponge under a microscope.

Working Example 1, Working Example 2 and Working Example 3

A flowable paste-like silicone rubber base, i.e. a liquid silicone rubber base, was prepared by placing 100 parts of a dimethylpolysiloxane with a viscosity of 10,000 mPa·s having both ends of the molecular chain blocked by dimethylvinylsiloxy groups (vinyl group content: 0.14%) (component (a)), 20 parts of fumed silica with a specific surface area of 200 $m^2/g$ (component (d)), 5 parts of hexamethyldisilazane used as a hydrophobing agent, and 1 part of water in a mixer equipped with stirring blades, mixing the components to homogeneity, and then stirring the mixture for two hours at 180° C. under reduced pressure. After cooling the base, a liquid silicone rubber composition was obtained by adding 0.5 parts of a dimethylsiloxane/methylhydrogensiloxane copolymer having both ends blocked by trimethylsiloxy groups (silicon-bonded hydrogen content: 0.8%) (component (b)), 0.1 parts of a chloroplatinic acid/divinyltetramethyldisiloxane complex (platinum concentration: 0.4%) (component (c)), and 0.1 parts of 3,5-dimethyl-1-hexyn-3-ol as an addition reaction inhibitor to 100 parts of the base and mixing the components to homogeneity. Several silicone rubber sponge emulsion compositions were prepared by placing the liquid silicone rubber composition (component (A)), as well as an aqueous solution of sodium polyacrylate (sodium polyacrylate content: 1.0%) (component (B)), polyoxyethylene dilaurate with an HLB value of 6.6 (component (C)), and polyoxyethylene dioleate with an HLB value of 10.4 (component (C)) in a commercially available Abitex mixer (from Matsubara Co., Ltd.) in the proportions listed in Table 1 and mixing the components for 10 minutes at a rotational speed of 9,000 rpm.

Next, after degassing with a vacuum pump in order to remove air bubbles from the silicone rubber sponge emulsion compositions, they were poured into the cavity of a sheet mold with a thickness of 2 mm and cured by maintaining them at 90° C. for 10 minutes, yielding moist silicone rubber sponge-like sheets. The sheets were placed in a hot air oven at 150° C. and hot air dried for 1 hour, yielding sheets of silicone rubber sponge. The shape of the silicone rubber sponge sheets faithfully reflected the shape of the inner surface of the mold. Their density, dimensional accuracy and cell diameter were measured and listed in Table 1. Based on the results, it was found that the silicone rubber sponge of the present invention had superior dimensional accuracy and mold conformability, small cell diameters, and excellent uniformity.

Comparative Example 1 and Comparative Example 2

An attempt was made to prepare several silicone rubber sponge emulsion compositions in accordance with the same procedure as in Working Examples 1, 2, and 3 based on the proportions listed in Table 1 and using the same raw materials as in Working Examples 1, 2, and 3 with the exception of Examples 1, 2, and 3 using water instead of an aqueous solution of sodium polyacrylate. However, stable emulsion compositions could not be prepared and moist silicone rubber sponge-like sheets could not be obtained.

Comparative Example 3

100 parts of the liquid silicone rubber compositions prepared in Working Examples 1, 2, and 3, 120 parts of water gelled with a water-absorbent polymer (a crosslinked partial sodium salt of an acrylic acid polymer from Sanyo Chemical Industries, Ltd., trade name SANFRESH ST500D) (water-absorbent polymer content: 2.0%), and 7 parts of polyoxyethylene dilaurate were placed in an Abitex mixer (from Matsubara Co., Ltd.) and mixed together, yielding silicone rubber sponge emulsion compositions. Silicone rubber sponge was produced in accordance with the same procedure as in Working Examples 1, 2, and 3, and its density, dimensional accuracy, and cell diameter were measured, and the results were listed in Table 1.

Working Example 4

A flowable paste-like silicone rubber base, i.e. a liquid silicone rubber base, was prepared by placing 100 parts of a dimethylsiloxane-methylvinylsiloxane copolymer with a viscosity of 40,000 mPa·s having both ends of the molecular chain blocked by trimethylsiloxy groups (vinyl group content: 0.14%) (component (a)) and 20 parts of AEROSIL R-972 (fumed silica hydrophobicized using dimethyldichlorosilane from Nippon Aerosil Co., Ltd.), in a mixer equipped with stirring blades, mixing the components to homogeneity, and stirring the mixture for two hours at 180° C. After cooling the base, a liquid silicone rubber composition was obtained by combining 100 parts of the base with 0.5 parts of a dimethylsiloxane-methylhydrogensiloxane copolymer having both ends blocked by trimethylsiloxy groups (silicon-bonded hydrogen content: 0.8%) (component (b)), 0.1 parts of a chloroplatinic acid/divinyltetramethyldisiloxane complex (platinum concentration: 0.4%) (component (c)), and 0.1 parts of 3,5-dimethyl-1-hexyn-3-ol as an addition reaction inhibitor and mixing the components to homogeneity. A silicone rubber sponge emulsion composition was prepared by weighing and placing 100 parts of the liquid silicone rubber composition (component (A)), 120 parts of an aqueous solution of sodium polyacrylate (sodium polyacrylate content: 2%), 2.5 parts of SANNONIC SS-50 (a higher alcohol-based nonionic surfactant from Sanyo Chemical Industries, Ltd., HLB 10.5), and 2.5 parts of SANNONIC SS-70 (a higher alcohol-based nonionic surfactant from Sanyo Chemical Industries, Ltd., HLB 12.8) in a container, placing the mixture in a T. K. Homomixer MARK Model II 2.5 (from IPROS Corporation), and mixing the components for 5 minutes at a rotational speed of 5,000 rpm. After degassing the silicone rubber sponge emulsion composition with the help of a vacuum pump, it was poured into the cavity of a sheet mold with a thickness of 2 mm and cured by maintaining it at 90° C. for 15 minutes, yielding a moist silicone rubber sponge-like sheet. A sheet of silicone rubber sponge was obtained by subjecting this moist silicone rubber sponge-like sheet to hot air drying in accordance with the same method as in Working Examples 1, 2, and 3. The shape of the silicone rubber sponge

TABLE 1

|  | Working Example 1 | Working Example 2 | Working Example 3 | Comparative Example 1 | Comparative Example 2 | Comparative Example 3 |
|---|---|---|---|---|---|---|
| Liquid silicone rubber composition (parts) | 100 | 100 | 100 | 100 | 100 | 100 |
| Aqueous solution of sodium polyacrylate (parts) | 120 | 180 | 120 |  |  |  |
| Water gelled with water-absorbent polymer (parts) |  |  |  |  |  | 120 |
| Water (parts) |  |  |  | 60 | 60 |  |
| Polyoxyethylene dioleate (parts) | 0.6 | 0.6 | 0.6 |  | 12 |  |
| Polyoxyethylene dilaurate (parts) | 2.5 | 2.5 |  | 18 |  | 7 |
| Emulsification | Excellent | Excellent | Excellent | Did not emulsify | Did not emulsify | Excellent |
| Density | 0.58 | 0.48 | 0.61 |  |  | 0.57 |
| Dimensional accuracy | 1.0 | 1.0 | 0.99 |  |  | 0.99 |
| Cell diameter (mm) | 0.1 to 0.2 | 0.1 to 0.2 | 0.05 to 0.1 |  |  | 0.2 to 0.8 | sheet faithfully reflected the shape of the inner surface of the mold. Its density, dimensional accuracy, and cell diameter were measured. It was found that it had a density of 0.59, a dimensional accuracy of 0.98, and cell diameters of 0.05 to 0.1 mm, and exhibited superior dimensional accuracy, mold conformability, small cell diameters, and excellent uniformity.

Comparative Example 4

A sheet of silicone rubber sponge was produced under the same conditions as in Working Example 4 with the exception of using 120 parts of water (water-absorbent polymer content: 0.3%) gelled with a water-absorbent polymer (a crosslinked partial sodium salt of an acrylic acid polymer from Sanyo Chemical Industries, Ltd., trade name SANFRESH ST500D) instead of the aqueous solution of sodium polyacrylate used in Working Example 4. They had a density of 0.58, a dimensional accuracy of 0.98, and cell diameters of 0.2 to 1.0 mm and exhibited considerable variation.

Working Example 5

A sheet of silicone rubber sponge was obtained by preparing a silicone rubber sponge emulsion composition by weighing and placing 100 parts of a liquid silicone rubber composition DY35-700A/B (from Dow Corning Toray Silicone Co., Ltd.) comprising a liquid diorganopolysiloxane having at least two vinyl groups per molecule, precipitated silica, an organopolysiloxane having three or more silicon-bonded hydrogens per molecule, and a platinum catalyst, as well as 120 parts of an aqueous solution of sodium polyacrylate (sodium polyacrylate content: 2%), 2.5 parts of SANNONIC SS-50 (a higher alcohol-based nonionic surfactant from Sanyo Chemical Industries, Ltd., HLB 10.5), and 2.5 parts of SANNONIC SS-70 (a higher alcohol-based nonionic surfactant from Sanyo Chemical Industries, Ltd., HLB 12.8) in a container, placing the mixture in a T. K. Homomixer MARK Model II 2.5 (from IPROS Corporation), and mixing the components for 5 minutes at a rotational speed of 5,000 rpm, followed by degassing, curing, and hot air drying the composition under the same conditions as in Working Example 4. The shape of the silicone rubber sponge sheet faithfully reflected the shape of the inner surface of the mold. It had a density of 0.57, a dimensional accuracy of 0.99, and cell diameters of 0.05 to 0.1 mm.

Based on the results, it was found that the silicone rubber sponge of the present invention had superior dimensional accuracy and mold conformability, small cell diameters, and excellent uniformity.

Working Example 6

A silicone rubber sponge emulsion composition was prepared by placing 100 parts of the liquid silicone rubber composition prepared in Working Examples 1, 2, and 3 (component (A)), 70 parts of an aqueous solution of sodium polyacrylate (sodium polyacrylate content: 1.0%) (component (B)), 30 parts of an aqueous solution of carboxymethyl cellulose (carboxymethyl cellulose content: 3.0%) (component (B)), 2 parts of polyoxyethylene dilaurate with an HLB value of 6.6 (component (C)), and 0.5 parts of polyoxyethylene dioleate with an HLB value of 10.4 (component (C)) in an Abitex mixer (from Matsubara Co., Ltd.) and mixing the components for 10 minutes at a rotational speed of 9,000 rpm. The emulsification of the silicone rubber sponge emulsion composition was excellent.

Next, a sheet of silicone rubber sponge was produced from this silicone rubber sponge emulsion composition under the same conditions as in Working Examples 1, 2, and 3. The shape of the silicone rubber sponge sheet faithfully reflected the shape of the inner surface of the mold. It had a density of 0.64, a dimensional accuracy of 0.95, and cell diameters of 0.05 to 0.1 mm. Based on the results, it was found that the silicone rubber sponge of the present invention had superior dimensional accuracy and mold conformability, small cell diameters, and excellent uniformity.

Working Example 7

A silicone rubber sponge emulsion composition was prepared under the same conditions as in Working Example 6 with the exception of using 50 parts of an aqueous solution of sodium polyacrylate (sodium polyacrylate content: 1.0%) (component (B)) and 50 parts of an aqueous solution of carboxymethyl cellulose (carboxymethyl cellulose content: 3.0%) (component (B)) in Working Example 6. The emulsification of the silicone rubber sponge emulsion composition was excellent. A sheet of silicone rubber sponge was produced from this silicone rubber sponge emulsion composition under the same conditions as in Working Examples 1, 2, and 3. The shape of the silicone rubber sponge sheet faithfully reflected the shape of the inner surface of the mold. They had a density of 0.63, a dimensional accuracy of 0.93, and cell diameters of 0.05 to 0.1 mm. Based on the results, it was found that the silicone rubber sponge of the present invention had superior dimensional accuracy and mold conformability, small cell diameters, and excellent uniformity.

Working Example 8

A flowable paste-like silicone rubber base, i.e. a liquid silicone rubber base, was prepared by placing 100 parts of a dimethylpolysiloxane with a viscosity of 10,000 mPa·s having both ends of the molecular chain blocked by dimethylvinylsiloxy groups (vinyl group content: 0.14%) (component (a)) and 17 parts of fumed silica with a surface area of 200 $m^2/g$ (component (d)) hydrophobicized with hexamethyldisilazane in a mixer equipped with stirring blades, mixing the components to homogeneity, and stirring the mixture for two hours at 180° C. under reduced pressure. An emulsion was prepared by placing 100 parts of the base, 100 parts of an aqueous solution of sodium polyacrylate (sodium polyacrylate content: 1.0%) (component (B)), 2 parts of polyoxyethylene dilaurate (component (C)) with an HLB value of 6.6, and 0.5 parts of polyoxyethylene dioleate (component (C)) with an HLB value of 10.4 in a T. K. Homomixer MARK Model II 2.5 (from IPROS Corporation) and mixing the components for 10 minutes at a rotational speed of 9,000 rpm. Next, a silicone rubber sponge emulsion composition was obtained by adding 0.5 parts of a dimethylsiloxane/methylhydrogensiloxane copolymer having both ends blocked by trimethylsiloxy groups (silicon-bonded hydrogen content: 0.8%) (component (b)), 0.3 parts of a chloroplatinic acid/divinyltetramethyldisiloxane complex (platinum concentration: 0.4%) (component (c)), and 0.01 parts of 3,5-dimethyl-1-hexyn-3-ol used as an addition reaction inhibitor and mixing the components to homogeneity. The emulsification of the silicone rubber sponge emulsion composition was excellent.

After degassing the silicone rubber sponge emulsion composition with a vacuum pump, it was poured into a cavity of a sheet mold with a thickness of 2 mm and cured by maintaining them at 90° C. for 10 minutes, yielding a moist silicone rubber sponge-like sheet. The sheet was placed in a hot air oven at 150° C. and hot air dried for 1 hour, yielding a silicone rubber sponge sheet. The shape of the silicone rubber sponge sheet faithfully reflected the shape of the inner surface of the mold. It had a density of 0.61, a dimensional accuracy of 0.99, and cell diameters of 0.1 to 0.2 mm. Based on the results, it was found that the silicone rubber sponge of the present invention had superior dimensional accuracy and mold conformability, small cell diameters, and excellent uniformity.

INDUSTRIAL APPLICABILITY

The silicone rubber sponge emulsion composition of the present invention is useful in the production of silicone rubber sponge of superior dimensional accuracy, small cell diameters, and good uniformity.

The inventive method for producing a silicone rubber sponge emulsion composition is useful for preparing silicone rubber sponge emulsion compositions exhibiting excellent emulsification even with small amounts of emulsifying agents.

The inventive method for producing silicone rubber sponge is useful for producing silicone rubber sponge of superior dimensional accuracy, small cell diameters, and good uniformity without using organic foaming agents, hydrogen gas, and volatile hydrocarbon gases as foaming agents. When silicone rubber sponge is molded in a mold, it is suitable for manufacturing silicone rubber sponge with good mold conformability.

The invention claimed is:

1. A silicone rubber sponge emulsion composition, which comprises (A) a liquid silicone rubber base comprising (a-1) a liquid diorganopolysiloxane having at least two alkenyl groups per molecule and a viscosity at 25° C. not less than 100 mPa·s and not more than 100,000 mPa·s and (a-4) a reinforcing filler, (a-2) an organopolysiloxane having at least two silicon-bonded hydrogen atoms per molecule, and (a-3) a platinum catalyst, ($B^1$) an aqueous solution of (b-1) a water-soluble polymer comprising sodium salt of an acrylic acid polymer, said water-soluble polymer being present in said component ($B^1$) in an amount of from 0.1 to 5% by weight, and (C) an emulsifying agent, and in which (a-1) to (a-3) or (a-1) to (a-4) in component (A) form an addition-curable type liquid silicone rubber composition, component ($B^1$) is contained in a proportion ranging from 50 to 250 parts by weight per 100 parts by weight of the total of (a-1) to (a-4) in component (A) and component (C) is contained in a proportion ranging from 0.1 to 10 parts by weight per 100 parts by weight of the total of (a-1) to (a-4) in component (A).

2. A method for producing a silicone rubber sponge emulsion composition, wherein an addition-curable type liquid silicone rubber composition is prepared by mixing (A) a liquid silicone rubber base made up of (a-1) a liquid diorganopolysiloxane having at least two alkenyl groups per molecule and a viscosity at 25° C. not less than 100 mPa·s and not more than 100,000 mPa·s and (a-4) a reinforcing filler, (a-2) an organopolysiloxane having at least two silicon-bonded hydrogen atoms per molecule, and (a-3) a platinum catalyst and an emulsion is made by mixing the addition-curable type liquid silicone rubber composition with ($B^1$) an aqueous solution of (b-1) a water-soluble polymer, the water-soluble polymer being present in component ($B^1$) in an amount of from 0.1 to 5% by weight, and (C) an emulsifying agent.

3. A method for producing a silicone rubber sponge emulsion composition, wherein an emulsion is produced by mixing (A) a liquid silicone rubber base comprising (a-1) a liquid diorganopolysiloxane having at least two alkenyl groups per molecule and a viscosity at 25° C. not less than 100 mPa·s and not more than 100,000 mPa·s and (a-4) a reinforcing filler, ($B^1$) an aqueous solution of (b-1) a water-soluble polymer, the water-soluble polymer being present in component ($B^1$) in an amount of from 0.1 to 5% by weight, and (C) an emulsifying agent, and the emulsion is mixed with (a-2) an organopolysiloxane having at least two silicon-bonded hydrogen atoms per molecule and (a-3) a platinum catalyst.

4. A silicone rubber sponge emulsion composition, which comprises (A) a liquid silicone rubber base comprising (a-1) a liquid diorganopolysiloxane having at least two alkenyl groups per molecule and a viscosity at 25° C. not less than 100 mPa·s and not more than 100,000 mPa·s and (a-4) a reinforcing filler, (a-2) an organopolysiloxane having at least two silicon-bonded hydrogen atoms per molecule, (a-3) a platinum catalyst, ($B^2$) an aqueous solution of (b-1) a water-soluble polymer comprising sodium salt of an acrylic acid polymer and (C) an emulsifying agent, said water-soluble polymer being present in said component ($B^2$) in an amount of from 0.1 to 5% by weight, and in which (a-1) to (a-3) or (a-1) to (a-4) in component (A) form an addition-curable type liquid silicone rubber composition, component (b-1) and water are contained in a proportion ranging from 10 to 250 parts by weight per 100 parts by weight of the total of (a-1) to (a-4) in component (A) and component (C) is contained in a proportion ranging from 0.1 to 10 parts by weight per 100 parts by weight of the total of (a-1) to (a-4) in component (A).

5. The silicone rubber sponge emulsion composition according to claim 1, wherein said sodium salt of an acrylic acid polymer is selected from the group consisting of sodium salt of polyacrylic acid, sodium salt of polymethacrylic acid, and sodium salt of polyacrylic acid/methacrylic acid, and combinations thereof, and component (C) is a nonionic surface active agent.

6. The method for producing a silicone rubber sponge emulsion composition according to claim 2, wherein component (b-1) is sodium salt of an acrylic acid polymer and component (C) is a nonionic surface active agent.

7. The method for producing a silicone rubber sponge emulsion composition according to claim 6, wherein the sodium salt of an acrylic acid polymer is selected from the group consisting of sodium salt of polyacrylic acid, sodium salt of polymethacrylic acid, and sodium salt of polyacrylic acid/methacrylic acid, and combinations thereof.

8. A method for producing a silicone rubber sponge, wherein the silicone rubber sponge is obtained by forming a moist silicone rubber-like molding by curing a silicone rubber sponge emulsion composition and then evaporating water from the molding by heating, wherein the silicone rubber sponge emulsion composition comprises (A) a liquid silicone rubber base comprising (a-1) a liquid diorganopolysiloxane having at least two alkenyl groups per molecule and a viscosity at 25° C. not less than 100 mPa·s and not more than 100,000 mPa·s and (a-4) a reinforcing filler, (a-2) an organopolysiloxane having at least two silicon-bonded hydrogen atoms per molecule, and (a-3) a platinum catalyst, ($B^1$) an aqueous solution of (b-1) a water-soluble polymer, the water-soluble polymer being present in component ($B^1$) in an amount of from 0.1 to 5% by weight, and (C) an emulsifying agent, and in which (a-1) to (a-3) or (a-1) to (a-4) in component (A) form an addition-curable type liquid silicone rubber composition, component ($B^1$) is contained in a proportion ranging from 10 to 250 parts by weight per 100 parts by weight of the total of (a-1) to (a-4) in component (A) and component (C) is contained in a proportion ranging from 0.1 to 10 parts by weight per 100 parts by weight of the total of (a-1) to (a-4) in component (A).

9. The method for producing a silicone rubber sponge according to claim 8, wherein the silicone rubber sponge emulsion composition is cured at a temperature between room temperature and less than 120° C. and the cured product is heated at 120° C. to 250° C.

10. The method for producing a silicone rubber sponge according to claim 8, wherein the silicone rubber sponge emulsion composition does not contain air bubbles.

11. The silicone rubber sponge emulsion composition according to claim 4, wherein component (b-1) is sodium salt of an acrylic acid polymer and component (C) is a nonionic surface active agent.

12. The silicone rubber sponge emulsion composition according to claim 11, wherein the sodium salt of an acrylic acid polymer is selected from the group consisting of sodium salt of polyacrylic acid, sodium salt of polymethacrylic acid, and sodium salt of polyacrylic acid/methacrylic acid, and combinations thereof.

13. The method for producing a silicone rubber sponge emulsion composition according to claim 3, wherein component (b-1) is sodium salt of an acrylic acid polymer and component (C) is a nonionic surface active agent.

14. The method for producing a silicone rubber sponge emulsion composition according to claim 13, wherein the sodium salt of an acrylic acid polymer is selected from the group consisting of sodium salt of polyacrylic acid, sodium salt of polymethacrylic acid, and sodium salt of polyacrylic acid/methacrylic acid, and combinations thereof.

15. A method for producing a silicone rubber sponge, wherein the silicone rubber sponge is obtained by forming a moist silicone rubber-like molding by curing a silicone rubber sponge emulsion composition and then evaporating water from the molding by heating, wherein the silicone rubber sponge emulsion composition comprises (A) a liquid silicone rubber base comprising (a-1) a liquid diorganopolysiloxane having at least two alkenyl groups per molecule and a viscosity at 25° C. not less than 100 mPa·s and not more than 100,000 mPa·s and (a-4) a reinforcing filler, (a-2) an organopolysiloxane having at least two silicon-bonded hydrogen atoms per molecule, (a-3) a platinum catalyst, ($B^2$) an aqueous solution of (b-1) a water-soluble polymer and (C) an emulsifying agent, said water-soluble polymer being present in said component ($B^2$) in an amount of from 0.1 to 5% by weight, and in which (a-1) to (a-3) or (a-1) to (a-4) in component (A) form an addition-curable type liquid silicone rubber composition, component (b-1) and water are contained in a proportion ranging from 10 to 250 parts by weight per 100 parts by weight of the total of (a-1) to (a-4) in component (A) and component (C) is contained in a proportion ranging from 0.1 to 10 parts by weight per 100 parts by weight of the total of (a-1) to (a-4) in component (A).

16. The method for producing a silicone rubber sponge according to claim 15, wherein the silicone rubber sponge emulsion composition is cured at a temperature between room temperature and 120° C. and the cured product is heated at a temperature of from 120° C. to 250° C.

17. The silicone rubber sponge emulsion composition according to claim 1, wherein component (a-4) is added in an amount of 1 to 60 parts by weight per 100 parts by weight of component (a-1).

18. The silicone rubber sponge emulsion composition according to claim 4, wherein component (a-4) is added in an amount of 1 to 60 parts by weight per 100 parts by weight of component (a-1).

19. The silicone rubber sponge emulsion composition according to claim 1, wherein the sodium salt of an acrylic acid polymer is selected from the group consisting of sodium salt of polyacrylic acid, sodium salt of polymethacrylic acid, sodium salt of polyacrylic acid/methacrylic acid, and combinations thereof.

20. The silicone rubber sponge emulsion composition according to claim 4, wherein the sodium salt of an acrylic acid polymer is selected from the group consisting of sodium salt of polyacrylic acid, sodium salt of polymethacrylic acid, sodium salt of polyacrylic acid/methacrylic acid, and combinations thereof.

21. A method for producing a silicone rubber sponge emulsion composition, wherein an emulsion is produced by mixing (A) a liquid silicone rubber base comprising (a-1) a liquid diorganopolysiloxane having at least two alkenyl groups per molecule and a viscosity at 25° C. not less than 100 mPa·s and not more than 100,000 mPa·s and (a-4) a reinforcing filler and ($B^1$) an aqueous solution of (b-1) a water-soluble polymer and (C) an emulsifying agent, the water-soluble polymer being present in component ($B^1$) in an amount of from 0.1 to 5% by weight, and the emulsion is mixed with (a-2) an organopolysiloxane having at least two silicon-bonded hydrogen atoms per molecule and (a-3) a platinum catalyst.

22. The silicone rubber sponge emulsion composition according to claim 1, wherein the water-soluble polymer further comprises carboxymethyl cellulose.

23. The silicone rubber sponge emulsion composition according to claim 4, wherein the water-soluble polymer further comprises carboxymethyl cellulose.

* * * * *